United States Patent
Sonntag et al.

(10) Patent No.: US 11,660,717 B2
(45) Date of Patent: May 30, 2023

(54) SUCTION ADAPTER

(71) Applicant: Robert Bosch GmbH, Stuttgart (DE)

(72) Inventors: Stefan Sonntag, Vogt (DE); Rainer Widmann, Bodnegg (DE)

(73) Assignee: Robert Bosch GmbH, Stuttgart (DE)

( * ) Notice: Subject to any disclaimer, the term of this patent is extended or adjusted under 35 U.S.C. 154(b) by 338 days.

(21) Appl. No.: 16/650,288

(22) PCT Filed: Sep. 24, 2018

(86) PCT No.: PCT/EP2018/075762
§ 371 (c)(1),
(2) Date: Mar. 24, 2020

(87) PCT Pub. No.: WO2019/086171
PCT Pub. Date: May 9, 2019

(65) Prior Publication Data
US 2020/0230765 A1 Jul. 23, 2020

(30) Foreign Application Priority Data

Oct. 30, 2017 (DE) ...................... 10 2017 219 447.2

(51) Int. Cl.
*B23Q 11/00* (2006.01)

(52) U.S. Cl.
CPC ...... *B23Q 11/0046* (2013.01); *B23B 2251/68* (2013.01)

(58) Field of Classification Search
CPC .............. B23Q 11/0046; B23Q 11/006; B23Q 11/0071; B23B 2270/30; B23B 2270/62; B25D 17/20–22
See application file for complete search history.

(56) References Cited

U.S. PATENT DOCUMENTS

| 994,430 | A | * | 6/1911 | Tunks | B23Q 11/0046 408/72 R |
| 1,266,130 | A | * | 5/1918 | Kimbler | F16K 15/033 251/303 |
| 1,505,958 | A | * | 8/1924 | Huntting | F16K 15/033 137/527.2 |
| 2,624,064 | A | * | 1/1953 | Snyder | A47L 9/06 15/419 |
| 4,196,745 | A | * | 4/1980 | Schutzer | F16K 15/033 137/527 |
| 4,296,572 | A | * | 10/1981 | Quintana | B23D 69/00 451/356 |

(Continued)

FOREIGN PATENT DOCUMENTS

| CN | 1232740 A | 10/1999 |
| CN | 102773926 A | 11/2012 |

(Continued)

OTHER PUBLICATIONS

International Search Report corresponding to PCT Application No. PCT/EP2018/075762, dated Jan. 11, 2019 (German and English language document) (8 pages).

*Primary Examiner* — Joshua G Kotis
(74) *Attorney, Agent, or Firm* — Maginot, Moore & Beck LLP (57) ABSTRACT

A suction adapter for a drilling tool with a conduit includes a housing, at least one air intake port, and a valve unit. The valve unit is configured to open the air intake port as a function of a flow parameter.

15 Claims, 8 Drawing Sheets

(56) References Cited

U.S. PATENT DOCUMENTS

| | | | | |
|---|---|---|---|---|
| 4,459,959 A * | 7/1984 | Terada | ............... | F02M 47/046 |
| | | | | 123/446 |
| 4,839,995 A * | 6/1989 | Hutchins | ............... | B24B 23/04 |
| | | | | 451/357 |
| 5,605,421 A * | 2/1997 | Hodgson | ............... | B23Q 11/0046 |
| | | | | 408/67 |
| 6,047,693 A * | 4/2000 | Yamami | ............... | B23D 59/006 |
| | | | | 30/124 |
| 6,393,628 B1 * | 5/2002 | Kellogg | ............... | F16K 1/2021 |
| | | | | 4/496 |
| 6,514,131 B1 * | 2/2003 | Reich | ............... | B23Q 11/0046 |
| | | | | 451/344 |
| 6,746,321 B2 * | 6/2004 | Link | ............... | B24B 23/00 |
| | | | | 451/344 |
| 6,830,507 B2 * | 12/2004 | Reich | ............... | B24B 23/00 |
| | | | | 451/356 |
| 6,969,311 B2 * | 11/2005 | Chen | ............... | B24B 23/03 |
| | | | | 409/137 |
| 9,586,793 B2 * | 3/2017 | Prindiville | ............... | B66C 1/0212 |
| 10,507,557 B2 * | 12/2019 | Meiser | ............... | B23Q 11/0046 |
| 2002/0152731 A1 * | 10/2002 | Reich | ............... | B23Q 11/0046 |
| | | | | 55/385.1 |
| 2004/0020671 A1 * | 2/2004 | Lamprecht | ............... | B23Q 11/0046 |
| | | | | 173/217 |
| 2005/0268427 A1 | 12/2005 | Britz | | |
| 2007/0179432 A1 * | 8/2007 | Bar Or | ............... | A61B 1/00135 |
| | | | | 604/30 |
| 2009/0317200 A1 * | 12/2009 | Bruntner | ............... | B23Q 11/0046 |
| | | | | 408/67 |
| 2013/0319711 A1 * | 12/2013 | Simm | ............... | B23Q 11/0071 |
| | | | | 173/197 |
| 2017/0087707 A1 * | 3/2017 | Appel | ............... | B23Q 17/00 |
| 2018/0085873 A1 * | 3/2018 | Rompel | ............... | B23D 59/006 |
| 2019/0247991 A1 * | 8/2019 | Hartmann | ............... | B23Q 11/0046 |

FOREIGN PATENT DOCUMENTS

| | | |
|---|---|---|
| CN | 106413956 A | 2/2017 |
| DE | 26 03 330 A1 | 8/1977 |
| DE | 94 15 732 U1 | 2/1995 |
| DE | 297 00 334 U1 | 4/1997 |
| DE | 199 20 058 A1 | 11/2000 |
| EP | 2 839 924 A1 | 2/2015 |
| EP | 3 147 051 A1 | 3/2017 |
| EP | 3 299 120 A2 | 3/2018 |
| GB | 694 963 A | 7/1953 |
| WO | 2017/050730 A1 | 3/2017 |
| WO | WO-2017076457 A1 * | 5/2017 |

* cited by examiner

SUCTION ADAPTER

This application is a 35 U.S.C. § 371 National Stage Application of PCT/EP2018/075762, filed on Sep. 24, 2018, which claims the benefit of priority to Serial No. DE 10 2017 219 447.2, filed on Oct. 30, 2017 in Germany, the disclosures of which are incorporated herein by reference in their entirety.

BACKGROUND

WO 2017/050730 A1 describes a tool for roughening a drilling surface, which has a suction-extraction channel, extending axially along a longitudinal axis of the tool, for extracting drilling dust by suction. The tool is surrounded circumferentially on its shank by an adapter, which is designed for connecting a suction-extraction device.

Since the suction-extraction devices used normally provide a much higher air volume flow than can be passed through the drilling tool, commercially available adapters have air intake openings in their housing, such that the suction-extraction device can draw additional air from the surroundings through these openings.

SUMMARY

The disclosure relates to a suction-extraction adapter for a drilling tool that has a transport channel, comprising a housing and comprising at least one air-intake opening. It is proposed that the suction-extraction adapter have a valve unit, which is designed to open the air-intake opening in dependence on a flow parameter. Advantageously, the air volume flow in the suction-extraction adapter can thereby be adapted on the basis of the air volume flow provided by a suction-extraction device.

The drilling tool is realized, in particular, as a masonry drill bit designed for a hammer drill. Along its longitudinal axis, the drilling tool has an insertion end, a connection region for coupling the drilling tool to the suction-extraction adapter, a shank region and a drilling head. At its end that faces away from the drilling head, the drilling tool has the insertion end, which is designed for coupling to the hand-held power tool such as, for example, a hammer drill. Preferably, in the region of the insertion end the drilling tool is realized in such a manner that it can be coupled to a tool receiver of the hand-held power tool. As an example, in the region of the insertion end the drilling tool may have form-fit elements, realized as special grooves, that form an SDS-plus interface or an SDS-max interface. For the purpose of performing work on a workpiece, the drilling tool is put into a rotating and linearly oscillating, or percussive, state by means of the hammer drill. During the work operation, the drilling tool penetrates the workpiece in the direction of advance of the drilling tool. The longitudinal axis of the drilling tool corresponds, in particular, to a work axis or rotation axis of the drilling tool. A drilling head in this context is to be understood to mean, in particular, a region of the drilling tool that has at least one cutting body. The cutting body has at least one cutting element. The at least one cutting element is made, in particular, from a hard metal.

The transport channel is designed, in particular, to transport a fluid, preferably an air flow, within the drilling tool. The transport channel is preferably designed to extract drill cuttings inside a drill hole by suction during a drilling operation. The drill cuttings are preferably transported contrary to the direction of advance of the drilling tool, via the transport channel. The transport channel has an intake opening and a suction-extraction opening, the distance between which corresponds to the length of the transport channel. The drill cuttings can enter the transport channel via the intake opening.

The connection region of the drilling tool has, in particular, at least one connection element that is designed to connect the drilling tool to the suction-extraction adapter, in particular in a form-fitting manner. The suction-extraction adapter has at least one connection element that is designed for coupling the suction-extraction adapter to the drilling tool. In particular, the connection element of the suction-extraction adapter is realized so as to correspond to the connection element of the drilling tool. Preferably, the suction-extraction adapter is realized so as to be partially movable relative to the drilling tool when connected. In particular, the suction-extraction adapter is mounted so as to be substantially axially immovable on the drilling tool and rotatable about the drilling tool, such that the suction-extraction adapter is substantially fixed axially on the drilling tool, and the drilling tool can rotate within the suction-extraction adapter. In particular, the suction-extraction adapter is fixed to the drilling tool with play.

The housing of the suction-extraction adapter has a connection piece, which is designed for connecting the suction-extraction adapter to the suction-extraction device, in particular for connecting the suction-extraction adapter to a suction hose of the suction-extraction device. The housing has a suction-extraction chamber, through which the air flow, or drill cuttings, move(s) when the suction-extraction device is connected. In particular, the suction-extraction chamber is arranged between the suction-extraction opening of the drilling tool and the connection piece. The housing of the suction-extraction adapter is realized, in particular, as an outer housing. Preferably, the air intake opening is arranged in the housing of the suction-extraction adapter. The air intake opening is arranged, in particular, in such a manner that an additional, or second, air flow can enter the suction-extraction chamber from the surroundings. In particular, the air intake opening can be closed, at least partially.

The flow parameter may be realized, for example, as a flow velocity, as a volume flow rate, an air volume flow, a pressure, or any other parameter that characterizes the air flow present in the suction-extraction adapter.

Furthermore, it is proposed that the valve unit have a closure element that is mounted so as to be movable between a maximally throttled position and at least one less throttled position. Advantageously, the position of the closure element can be used to adjust the air flow, or the flow parameter, within the suction-extraction adapter. In the maximally throttled position, the closure element is arranged in such a manner that the least amount of air can enter the suction-extraction chamber via the air intake opening, or the flow resistance is maximal in the region of the air intake opening. Preferably, in the maximally throttled position the closure element is arranged in such a manner that the air intake opening is closed, and thus no air flow can enter via the air intake opening. Advantageously, the air volume flow in the suction-extraction chamber can thus be adapted to the suction power of the suction-extraction device.

Furthermore, it is proposed that the valve unit be realized in such a manner that the position of the closure element is controlled automatically, by closed-loop or open-loop control, in dependence on the flow parameter. Advantageously, a suction-extraction adapter that is particularly comfortable to use can thus be realized. In particular, the valve unit is is realized in such a manner that the position of the closure element is controlled automatically, by closed-loop or open-loop control, in dependence on a pressure difference between the suction-extraction chamber and the surroundings. Preferably, in the case of a pressure difference of substantially zero, the closure element is arranged in the maximally throttled position.

It is additionally proposed that the valve unit have a restoring element, the position and/or shape of which depends on the flow parameter. In particular, the restoring element is movably coupled to the closure element. Advantageously, the position of the closure element can be controlled automatically, by closed-loop control, by means of the restoring element. Preferably, the restoring element applies a force to the closure element, preferably applying a force in the direction of a maximally throttled position.

Furthermore, it is proposed that the closure element be mounted in a linearly movable and/or pivotable manner. It is thus possible, advantageously, to realize a structurally simple and space-saving valve unit.

Furthermore, it is proposed that the closure element and the restoring element be realized as a single piece. It is thus possible, advantageously, to realize an inexpensive valve unit. In particular, the closure element is at least partially elastic and/or deformable.

It is additionally proposed that the valve unit have a positioning element that is movably coupled to the closure element, and the positioning element can be controlled, by closed-loop or open-loop control, in particular via a set of electronics. Advantageously, particularly efficient adjustment of the air volume flow can thus be realized.

Furthermore, it is proposed that the suction-extraction adapter have a display element, which is designed to display the flow parameter, or information that is dependent on the flow parameter. The display element is advantageously arranged visibly on the housing of the suction-extraction adapter. However, it is also conceivable for the display element to be arranged on the hand-held power tool. The display element may be realized as a screen, for example. The display element may be controlled via the set electronics, with the set of electronics transmitting flow parameters, determined by means of sensor elements, to the display element. It is also conceivable for the display element to be mechanically coupled to the valve unit, in particular to the closure element or the restoring element, such that, for example, the position of the closure element can be displayed, via a viewing window, in the form of a green color for minimally throttled, and a red color for maximally throttled. Information dependent on the flow parameter may be understood to mean, for example, that the display element indicates whether a blockage is present, in particular whether there is a blockage of the drilling tool.

Furthermore, the disclosure relates to a tool system having a suction-extraction adapter. The tool system comprises at least one of the following devices: hand-held power tool, drilling tool and/or suction-extraction device. In particular, the air-intake opening of the suction-extraction adapter is maximally throttled when the suction-extraction device is in a switched-off state.

BRIEF DESCRIPTION OF THE DRAWINGS

Further advantages are given by the following description of the drawings. The drawings, the description and the claims contain numerous features in combination. Persons skilled in the art will also expediently consider the features individually and combine them to form appropriate further combinations. References of features of differing embodiments of the disclosure that substantially correspond are denoted by the same number and by a letter identifying the embodiment.

There are shown.

DETAILED DESCRIPTION

Figure 1:
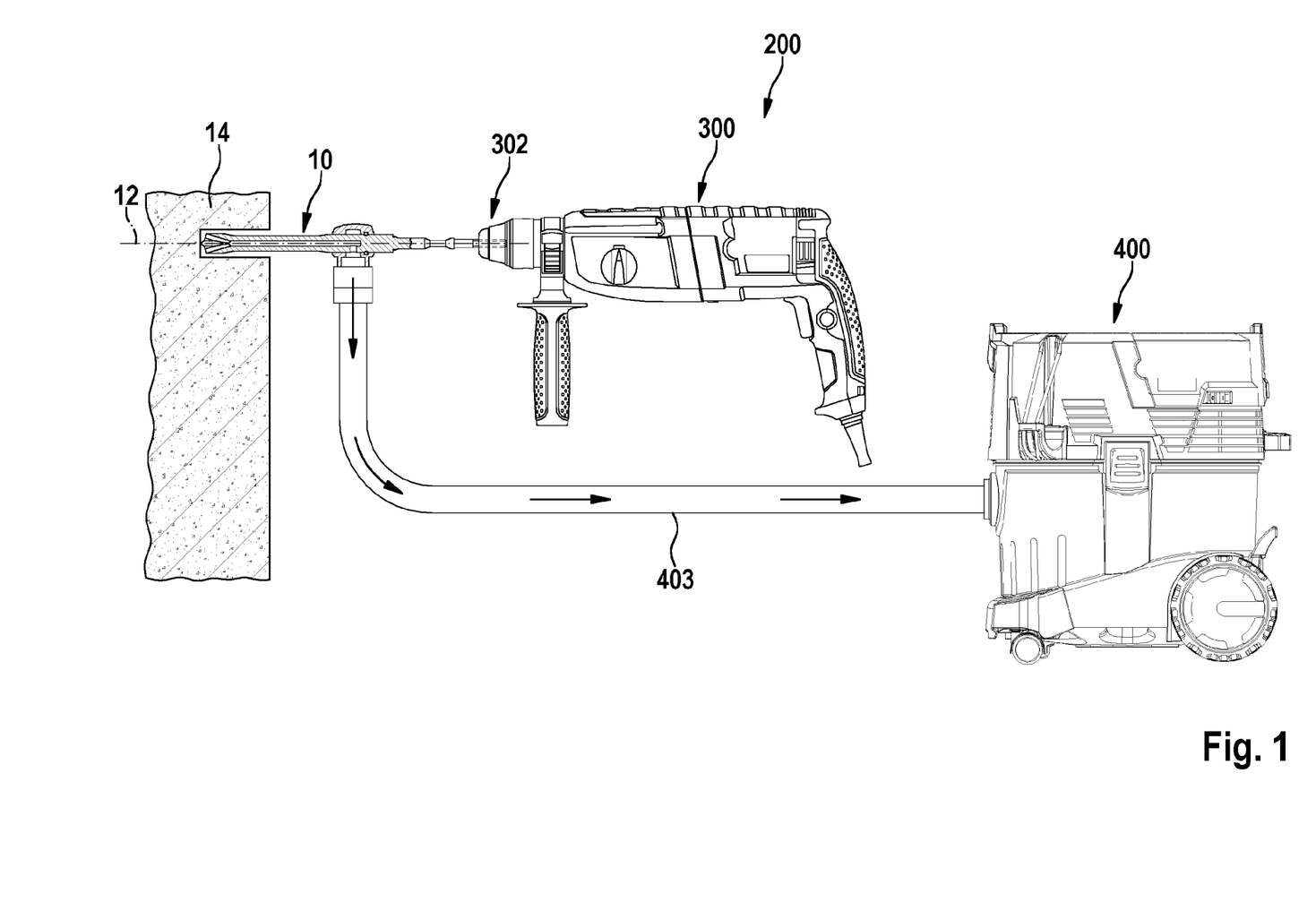
FIG. 1 a schematic view of a tool system.

FIG. 1 shows a schematic view of a tool system 200. The tool system 200 comprises a drilling tool 10, a hand-held power tool 300, a suction-extraction adapter 402 and a suction-extraction device 400. The hand-held power tool 300 is realized, for example, as a hammer drill. The hand-held power tool 300 has a tool receiver 302, which is designed to receive an insert tool realized, for example, as a drilling tool 10. The hand-held power tool 300 has a drive unit, not represented, that comprises an electric motor, and has a transmission that comprises a pneumatic percussion mechanism. By means of the drive unit and the transmission, the drilling tool 10, when coupled, can be driven rotationally about a longitudinal axis 12 of the drilling tool 10, and in a linearly oscillating, or percussive, manner along the longitudinal axis 12. The drilling tool 10 is realized as a masonry drill bit, and is shown in an enlarged representation in FIG. 2a. The drilling tool 10 is designed, in particular, to produce a drilled hole in a workpiece 14, for example a masonry wall. The drilling tool 10 has an insertion end 16, which is designed for coupling the drilling tool 10 to the hand-held power tool 300. The insertion end 16 is substantially cylindrical, and has form-fit elements 18 realized as elongate grooves. The tool receiver 302 of the hand-held power tool 300 has corresponding form-fit elements, not represented, that, in the coupled state, are connected to the form-fit elements 18 of the drilling tool 10.

Figure 2A:
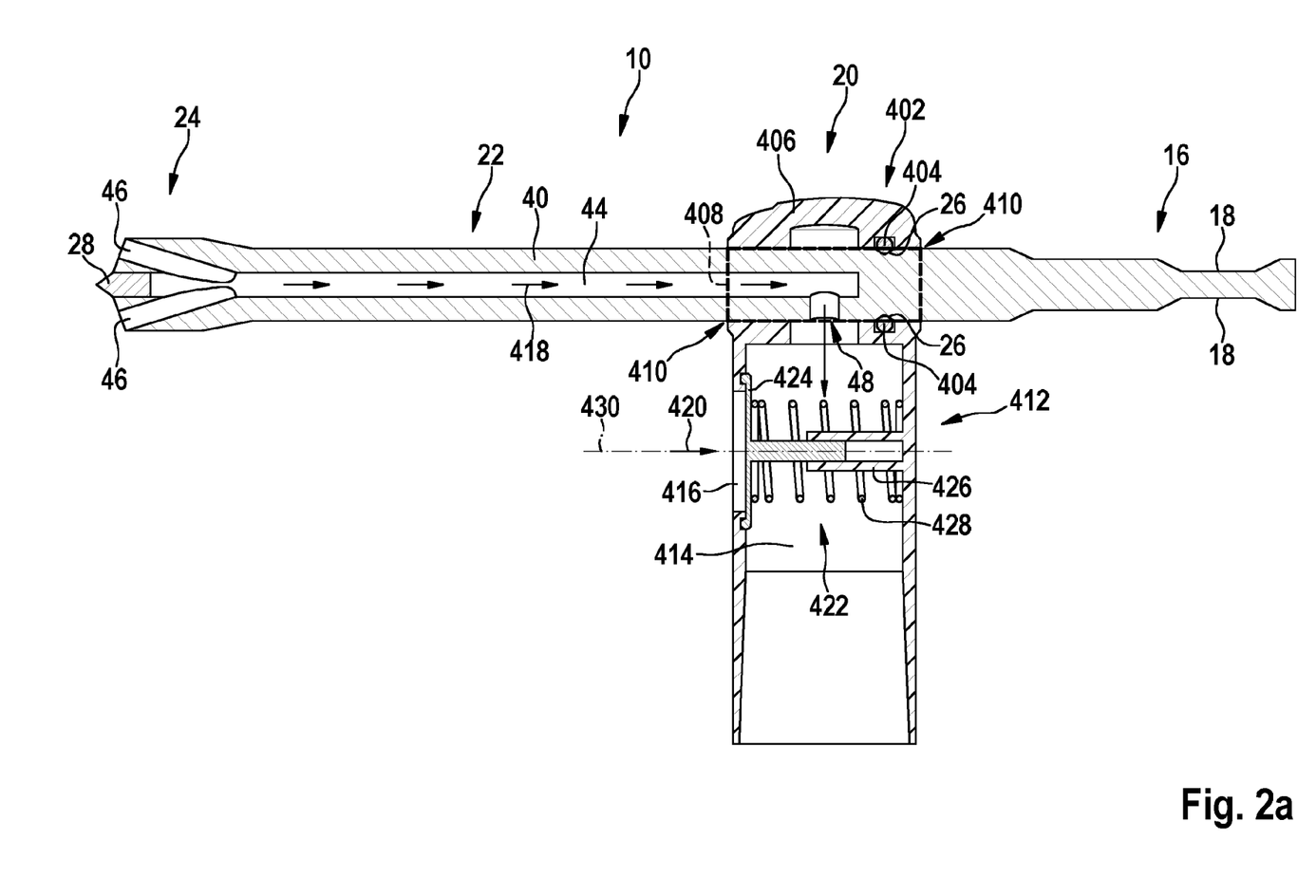
FIG. 2a a first embodiment of a suction-extraction adapter in the maximally throttled state.

Starting from the insertion end 16, the drilling tool 10, along its longitudinal extent, has a connection region 20 for connecting the drilling tool 10 to the suction-extraction adapter 402, a shank region 22 and a drilling head 24. The front end of the drilling tool 10 is formed by the drilling head 24, and the rear end of the drilling tool 10 is formed by the insertion end 16. At the front, the drilling head 24 has a cutting body 28.

The drilling tool 10 comprises a transport channel 44 which, starting from the drilling head 24, extends via the shank region 22 to the connection region 20. In the shank region 22, for example, the transport channel 44 extends in a straight line and coaxially with the longitudinal axis 12 of the drilling tool 10. In the shank region, the transport channel 44 is realized, for example, as a central bore in a basic body 40 of the drilling tool 10. The transport channel 44 has intake openings 46, via which drill cuttings can enter the transport channel 44 during the operation of drilling in the drill hole. The intake openings 46 are arranged in the drilling head 24. The intake openings 46 are formed, for example, by two bores that extend obliquely in relation to the transport channel 44, or to the longitudinal axis 12, and that connect the intake openings 46 to the transport channel 44. The transport channel 44 terminates in the connection region 20. In the connection region 20, the transport channel 44 has a suction-extraction opening 48, realized as a transverse bore, via which drill cuttings can exit the transport channel 44. Also conceivable, without limitation of the disclosure, are differently designed drilling tools having one or more transport channels and intake openings.

The suction-extraction adapter 402 has a housing 406, which is made from a plastic. The housing 406 is realized, for example, as a single piece, and has a coupling region 408 arranged between two coupling openings 410 in the housing 406. For the purpose of connecting the drilling tool 10 to the suction-extraction adapter 402, the drilling tool 10 is first pushed, with its insertion end 16, through the two coupling openings 410. In the connection region 20, the drilling tool 10 has a connection element 26 realized as an externally circumferential groove. The suction-extraction adapter 402 has a corresponding connection element 404, realized as a rubber ring. In the connected state, the connection elements 26, 404 are in engagement with each other in such a manner that the suction-extraction adapter 402 is held, with play, in the axial direction. Preferably, the drilling tool 10 and the suction-extraction adapter 402 can be connected to each other, via the connection elements 26, 404, in such a manner that they are rotatable relative to each other and fixed axially. The suction-extraction adapter 402, in particular the housing 406 of the suction-extraction adapter 402, bears against the drilling tool 10 in the coupling region 408. Alternatively, it is also conceivable for the suction-extraction adapter, or the housing of the suction-extraction adapter, to be of a multi-part design, for example a housing half-shell design.

The suction-extraction adapter 402 is connected to the suction-extraction device 400, realized as an industrial suction unit, via a hose 403 (see FIG. 1). The suction-extraction adapter 402 has a connection piece 412, which is designed for connecting the suction-extraction adapter 402 to the hose 403. The connection piece 412 is realized, for example, as a single piece with the housing 406. In particular, the connection piece 412 has a conical shape. In particular, the inner diameter of the housing 406 reduces continuously in the region of the connection piece 412.

The connection elements 26, 404 are arranged in such a manner that, when connected, the suction-extraction opening 48 of the drilling tool 10 is arranged in the coupling region 408. Arranged between the coupling region 408 and the connection piece 412 there is a suction-extraction chamber 414. An operative connection is established, via the suction-extraction chamber 414, between the transport channel 44 of the drilling tool 10 and the suction tube 403 attached to the connection piece 412.

The suction-extraction chamber 414 is surrounded laterally by the housing 406 of the suction-extraction adapter 402. The housing 406 has a closable air intake opening 416 in the region of the suction-extraction chamber 414. It is also conceivable for the housing 406 to have more than one closable air intake opening 416. It is also conceivable for the housing 406 additionally to have a non-closable air intake opening. Thus, a first air flow 418 is connected to the suction-extraction chamber 414 via the transport channel 44 of the drilling tool 10, and a second air flow 420 is connected to the suction-extraction chamber 414 via the air intake opening 416 of the suction-extraction adapter 402.

Figure 2B:
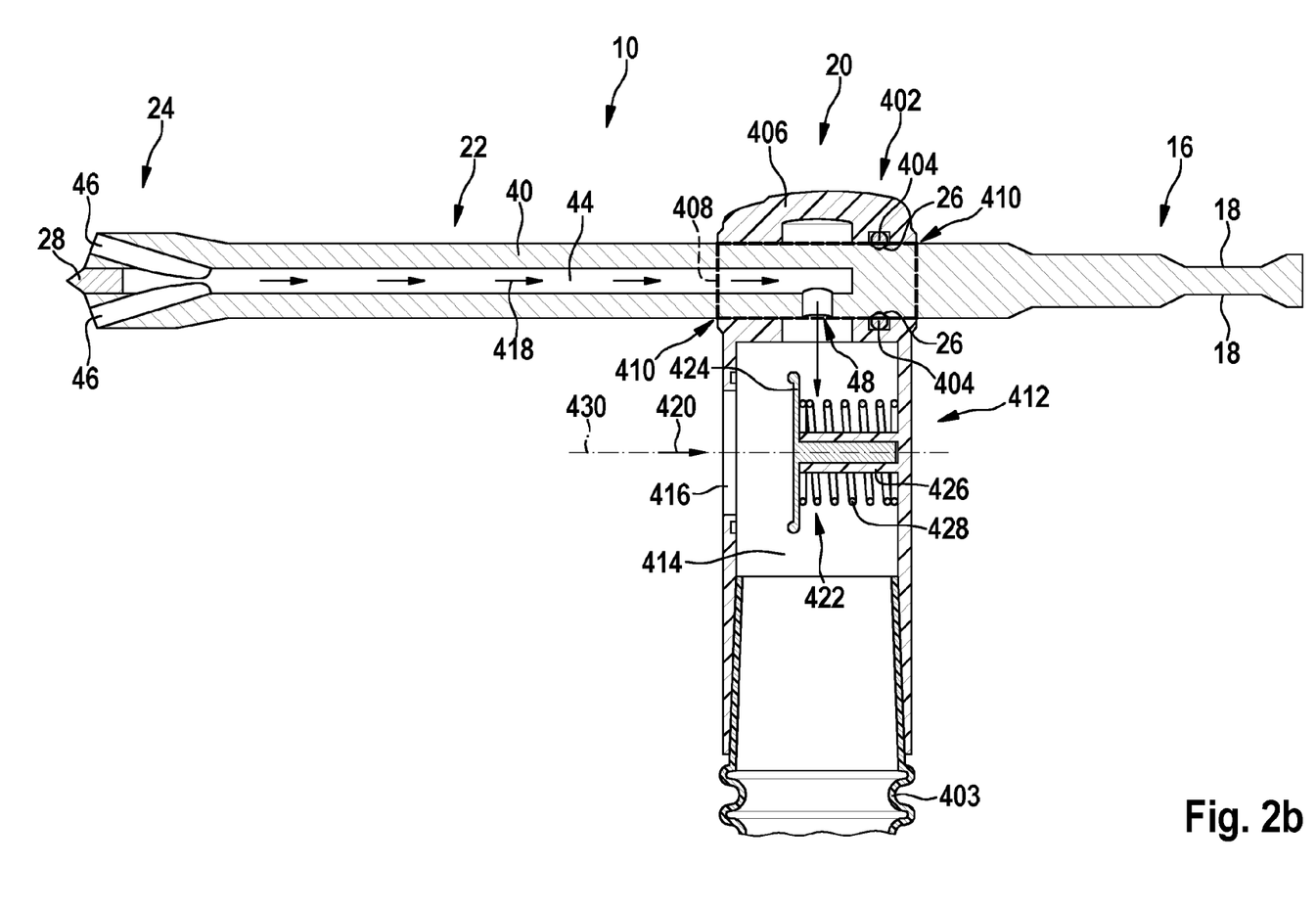
FIG. 2b the first embodiment of the suction-extraction adapter in the less throttled state.

The suction-extraction adapter 402 has a valve unit 422, which is designed to throttle the second air flow 420. FIG. 2a shows the valve unit in a maximally throttled position, and FIG. 2b shows it in a less throttled position. The valve unit 422 has a closure element 424 which, in the maximally throttled state, closes the air intake opening 416. The closure element 424 is mounted in a linearly movable manner in the housing 406 of the suction-extraction adapter 402. In particular, the housing 406 has a bearing element 426, realized as a dome in the shape of a hollow cylinder, for carrying the closure element 424. Furthermore, the valve unit 424 has a restoring element 428, realized as an annular spring, arranged between the housing 406 and the closure element 424. In particular, the restoring element 428 bears against the closure element 424 in such a manner that a force is applied to the closure element 424 along its translational movement axis 430. In particular, a force is applied to the closure element 424 in a direction with increased throttling of the second air flow 420. FIG. 2b shows the suction-extraction adapter 402 with a connected suction hose 403 and a suction-extraction device 400 having been switched on. When switched on, the suction-extraction device 400 produces a negative pressure in the suction-extraction chamber 414. Owing to the negative pressure, a force contrary to the force of the restoring element 428 acts upon the closure element 424. The closure element 424 thus moves along the guide into a position with a lesser throttling, or with a minimal throttling. The movement of the closure element 424 causes the air intake opening 416 to be opened, and the second air flow 420 can enter the suction-extraction chamber 414.

Figure 3A:
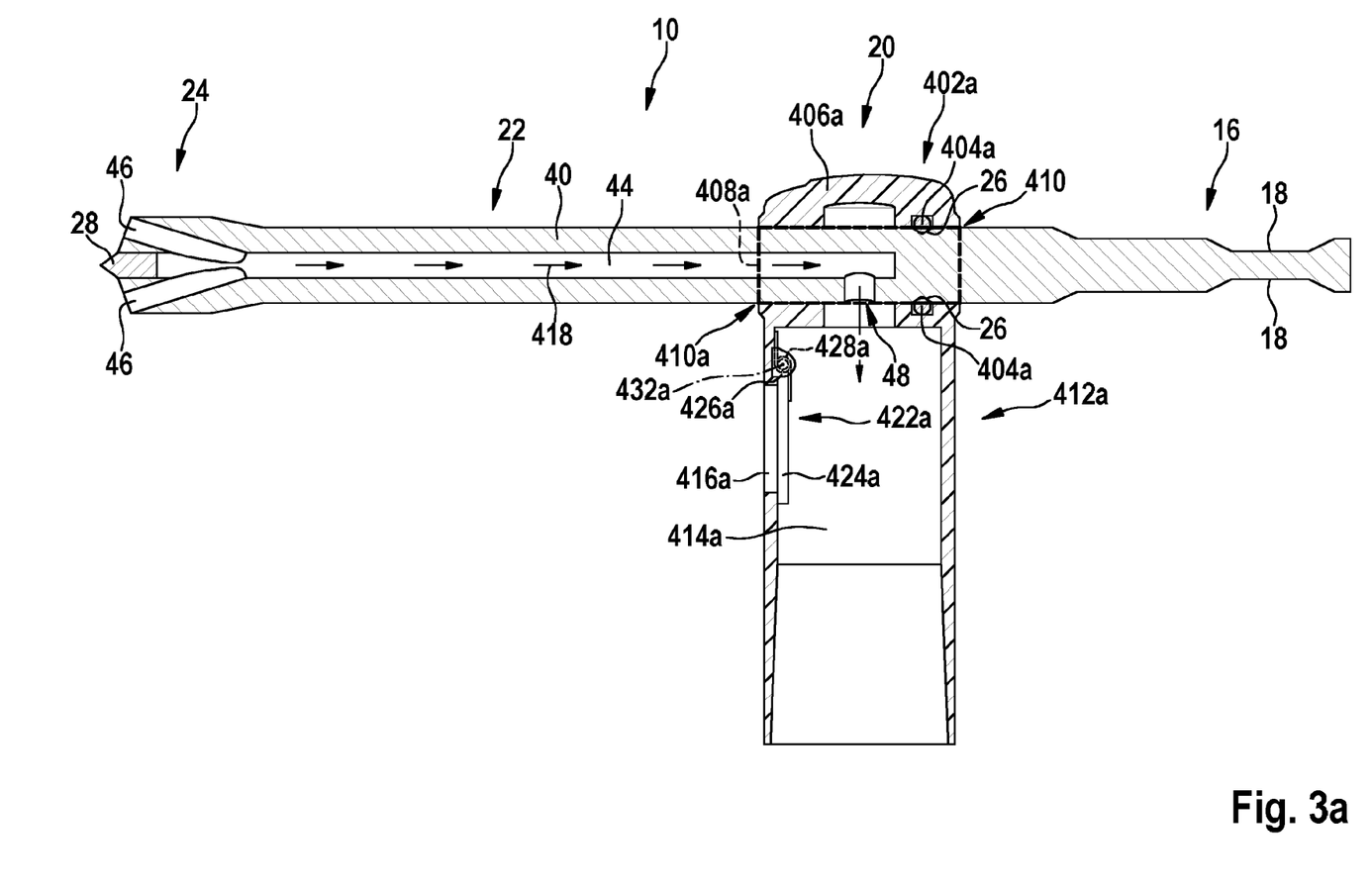
FIG. 3a a second embodiment of the suction-extraction adapter in the maximally throttled state.
Figure 3B:
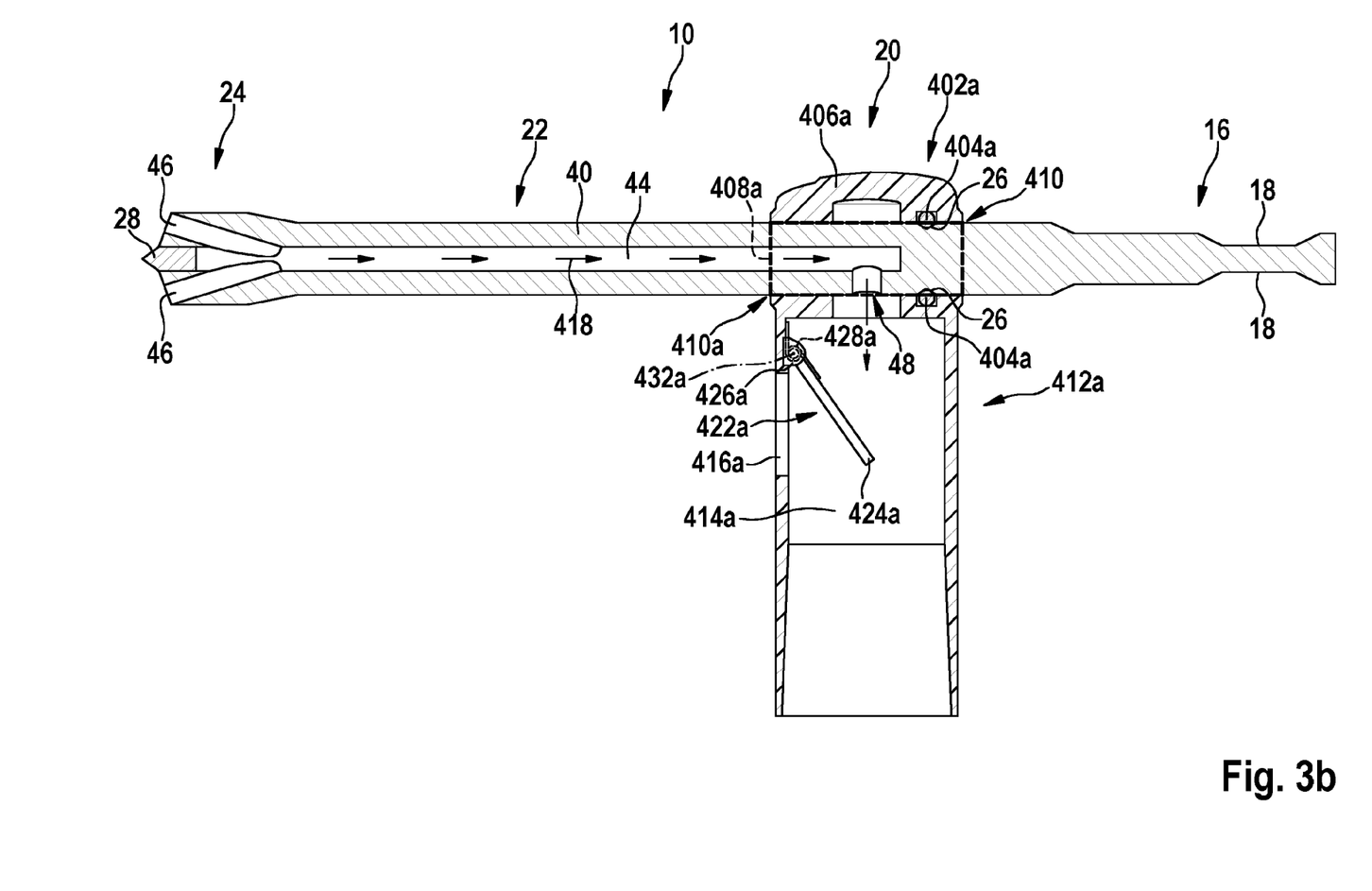
FIG. 3b the second embodiment of the suction-extraction adapter in the lesser throttled state.

FIG. 3a and FIG. 3b show an alternative embodiment of the valve unit 422a. As in FIGS. 2a and 2b, the valve unit 422a is shown both in a position with maximum throttling and with lesser throttling. The closure element 424a is realized as a flap, which is mounted so as to be rotatable about a rotation axis 432a. In FIG. 3a, the air intake opening 416a is closed by the closure element 424a. The closure element 424a is mounted in a rotatable manner by a bearing element 426a of the suction-extraction adapter 402a. The closure element 424a is connected to the housing 406a by a form-fit connection. A restoring element 428a, realized as a leg spring, is arranged in the region of the mounting of the closure element 424a. The restoring element 428a applies a force to the closure element 424a in a direction of rotation in such a manner that, without a pressure difference between the suction-extraction chamber 414a and the surroundings, the closure element 424a remains in the maximally throttled position. As shown in FIG. 3b, when the suction-extraction device 400 is switched on, the closure element 424a is moved, or rotated, about the rotation axis 432a in dependence on the pressure difference. The rotation axis 432a is arranged in the region of the air intake opening 416a that faces away from the connection piece 412a. The closure element 424a thus opens in the direction of the connection piece 412a. However, it is conceivable for the closure element 424a to open in the direction of the suction-extraction opening 48 of the drilling tool 10, or in the direction of the coupling region 408a, or laterally in relation to the connection piece 412a.

Figure 4A:
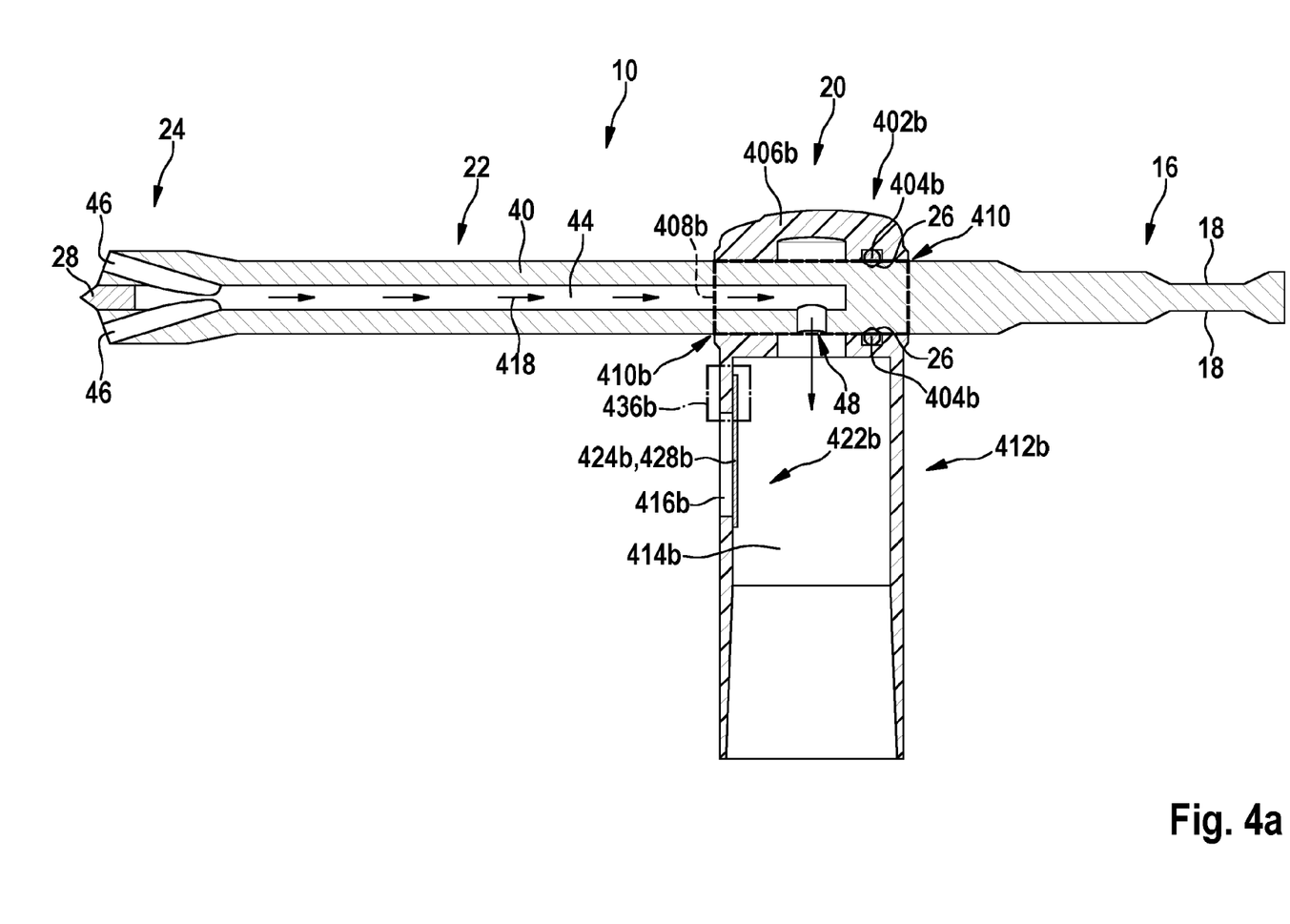
FIG. 4a a third embodiment of the suction-extraction adapter in the maximally throttled state.
Figure 4B:
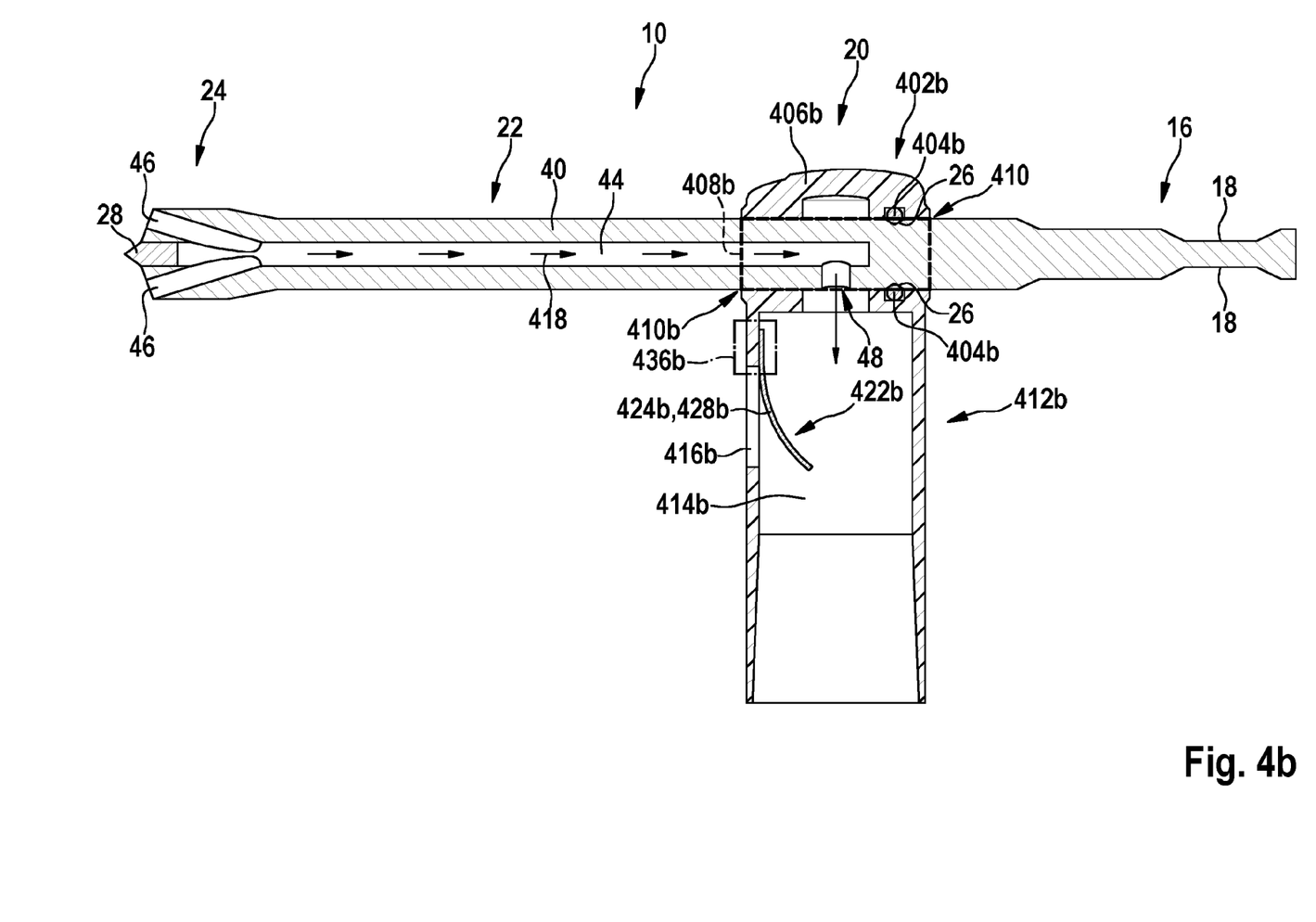
FIG. 4b the third embodiment of the suction-extraction adapter in the lesser throttled state.

FIGS. 4a and 4b show an alternative embodiment of the valve unit 422b. As in FIGS. 2a and 2b, the valve unit 422b is shown both in a position with maximum throttling and with lesser throttling. In this embodiment, the closure element 424b is realized as a single piece with the restoring element 428b. The closure element 424b is realized as an elastic flap. The elastic flap may be made from a metallic material and/or from a material containing plastic. The elastic flap is realized, for example, as a spring plate strip. The closure element 424*b* may be connected to the housing 406*b* by means of, for example, a materially bonded connection, for example by means of an adhesive joint. In addition or alternatively, it is also conceivable for the closure element 424*b* to be connected to the housing 406*b* in a form-fitting and/or force-fitting manner. For example, the spring plate strip could be hook-shaped at the end and engage in a corresponding groove in the housing 406*b*. The elastic closure element 424*b* is immovably fixed to the housing 406*a* in the connection region 436*b*. As shown in FIG. 4*b*, the negative pressure produced by means of the suction-extraction device 400 causes a force to act upon the elastic closure element 424*b*, which releases it from the air intake opening 416*b*.

The positioning of the closure elements, movement axes and associated directions of action of the restoring elements are only shown as examples, and may vary depending on the flow conditions of the suction-extraction adapter.

Figure 5:
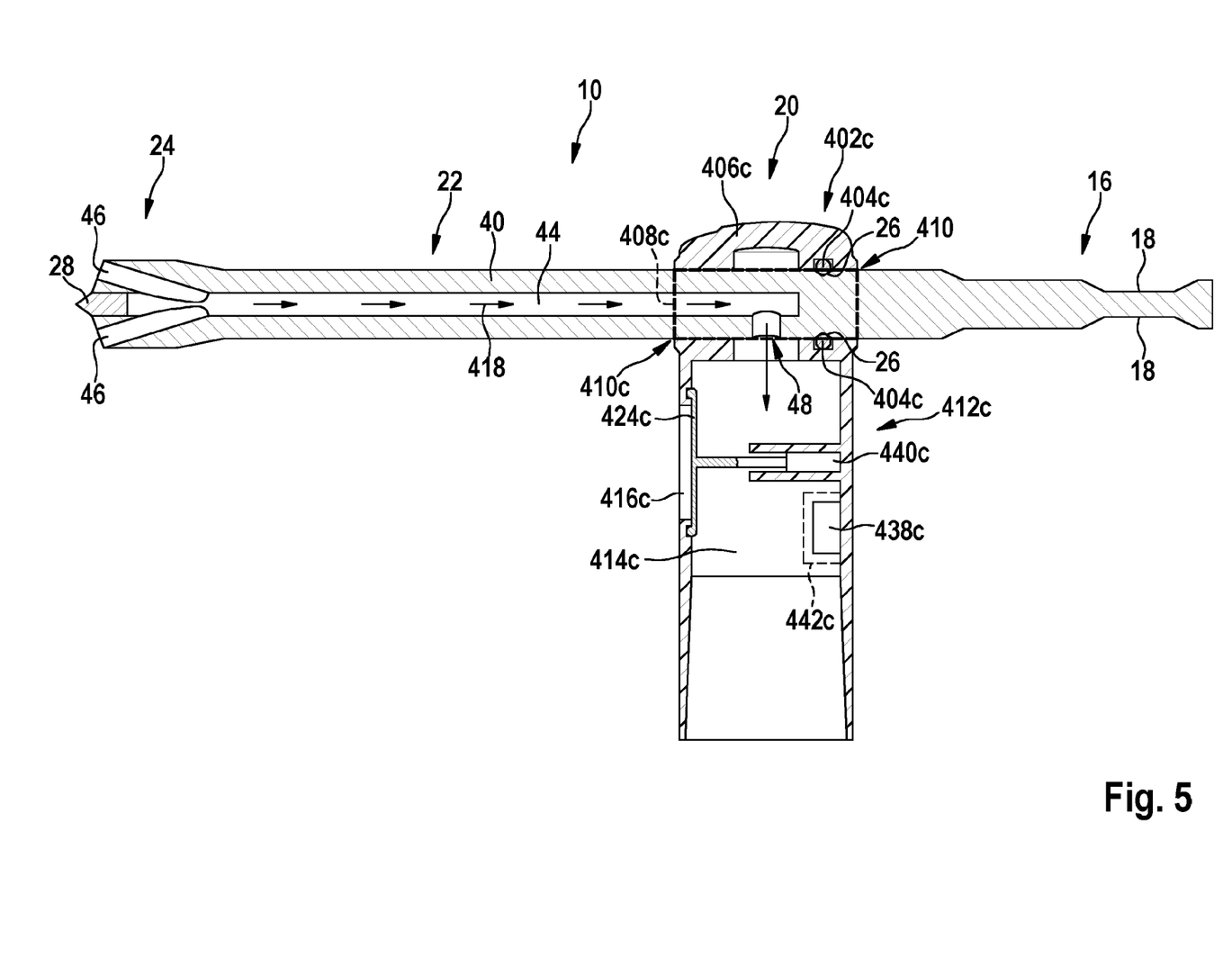
FIG. 5 a fourth embodiment of the suction-extraction adapter in the maximally throttled state.

FIG. 5 shows a further alternative embodiment of the suction-extraction adapter 402*c*. The suction-extraction adapter 402*c* has a sensor element 438*c*, which is designed to detect a flow parameter. The flow parameter may be realized, for example, as air volume flow, as pressure, or as another parameter that characterizes the flow present in the suction-extraction chamber 414*c*. The sensor element 438*c* is realized, for example, as a pressure sensor. The sensor element 438*c* is preferably arranged in the region of the suction-extraction chamber 414*c*. Furthermore, the housing 406*c* has an air intake opening 416*c*, and a closure element 424*c* that is mounted in a linearly movable manner. The closure element 424*c* is movably coupled to a positioning element 440*c*. The positioning element 440*c* has a motor drive unit and/or electromagnetic drive unit. Furthermore, the suction-extraction adapter 402*c* comprises a set of electronics 442*c* that is designed to control the positioning element 440*c*, by open-loop or closed-loop control, on the basis of a flow parameter sensed by the sensor element 438*c*. In particular, the positioning element 440*c* may be controlled by the set of electronics 442*c* in such a manner that the closure element 424*c* is moved into a position with a lesser throttling if a threshold value, in this example a pressure threshold value, is exceeded. Preferably, the positioning element 440*c* is connected to the sensor element 438*c* via the set of electronics 442*c*, either wirelessly or by a wired connection.

The invention claimed is:

1. A suction-extraction adapter for a drilling tool that has a transport channel, comprising:
    a housing defining a suction-extraction chamber and configured to couple to the drilling tool in such a way that a first airflow is produced from the transport channel to the suction-extraction chamber when suction is applied by a suction hose;
    at least one air-intake opening defined by the housing;
    a valve unit configured to open the at least one air-intake opening in dependence on a flow parameter; and
    a set of electronics arranged in or on the housing and configured to electronically operate the valve unit to open or close in dependence on the flow parameter,
    wherein when the valve unit is opened, a second airflow is produced from outside the housing, through the at least one air-intake opening, and into the suction-extraction chamber,
    wherein the housing has a coupling region at which the housing is configured to surround a portion of the drilling tool, the housing defining an inlet opening through which the first airflow passes from the transport channel into the suction-extraction chamber during the suction,
    wherein, at an end of the housing opposite the coupling region, the housing is configured to connect to the suction hose, and
    wherein the inlet opening defines a first inlet into the suction-extraction chamber for the first airflow, and the at least one air-intake opening defines a second inlet from outside the housing into the suction-extraction chamber for the second airflow.

2. The suction-extraction adapter as claimed in claim 1, wherein the valve unit has a closure element that is mounted so as to be movable between a maximally throttled position and at least one less throttled position.

3. The suction-extraction adapter as claimed in claim 2, wherein the valve unit is configured such that a position of the closure element is controlled automatically in dependence on the flow parameter.

4. The suction-extraction adapter as claimed in claim 3, wherein the set of electronics is configured to automatically control the position of the closure element by closed-loop or open-loop control in dependence on the flow parameter.

5. The suction-extraction adapter as claimed in claim 2, wherein the closure element is mounted in one or more of a linearly movable manner and a pivotable manner.

6. The suction-extraction adapter as claimed in claim 2, wherein the valve unit has a positioning element that is movably coupled to the closure element.

7. The suction-extraction adapter as claimed in claim 6, wherein the set of electronics is configured to control the positioning element.

8. The suction-extraction adapter as claimed in claim 7, wherein the set of electronics is configured to control the positioning element by closed-loop or open-loop control.

9. The suction-extraction adapter as claimed in claim 1, further comprising a display element configured to display the flow parameter or information that is dependent on the flow parameter.

10. The suction-extraction adapter as claimed in claim 1, wherein the housing is formed as a single piece.

11. The suction-extraction adapter as claimed in claim 1, wherein, at the end of the housing opposite the coupling region, the suction-extraction chamber has an outlet that opens into the suction hose.

12. The suction-extraction adapter as claimed in claim 1, wherein:
    the housing comprises a connection piece extending from the coupling region to the end of the housing opposite the coupling region and surrounding the suction extraction chamber, and
    the at least one air-intake opening is defined in a side wall of the connection piece.

13. The suction-extraction adapter as claimed in claim 1, further comprising:
    a sensor element configured to sense the flow parameter, wherein the set of electronics is operably connected to the sensor element and configured to control the valve unit to open and close based on the flow parameter sensed by the sensor element.

14. The suction-extraction adapter as claimed in claim 13, wherein the sensor element is a pressure sensor configured to sense a pressure in the suction-extraction chamber.

15. The suction-extraction adapter as claimed in claim 1, further comprising:

a motor or electromagnetic drive unit arranged in the housing and configured to open and close the valve unit, wherein the set of electronics is operably connected to the motor or electromagnetic drive unit and is configured to operate the motor or electromagnetic drive unit to open and close the valve unit in dependence on the flow parameter.

\* \* \* \* \*